United States Patent [19]

Murphy

[11] Patent Number: 4,728,345
[45] Date of Patent: Mar. 1, 1988

[54] MULTICOMPONENT GAS SEPARATION MEMBRANES HAVING POLYPHOSPHAZENE COATINGS

[75] Inventor: Milton K. Murphy, St. Charles, Mo.
[73] Assignee: Monsanto Company, St. Louis, Mo.
[21] Appl. No.: 566,132
[22] Filed: Dec. 28, 1983
[51] Int. Cl.[4] .............................................. B01D 13/00
[52] U.S. Cl. ..................................... 55/158; 210/490; 210/500.27
[58] Field of Search ................. 55/16, 158; 210/500.2, 210/490, 500.27

[56] References Cited

U.S. PATENT DOCUMENTS

4,214,020 7/1980 Ward et al. ..................... 55/158 X

Primary Examiner—Frank Spear
Attorney, Agent, or Firm—Henry Croskell

[57] ABSTRACT

Multicomponent membranes for gas separation having polyphosphazene coatings in occluding contact with a porous separation membrane are disclosed which are effective for separating at least one gas from gaseous mixtures and which exhibit improved stability when exposed to aromatic and aliphatic hydrocarbons contained in the gaseous mixtures. In addition multicomponent membranes for gas separations having a polyphosphazene coating in occluding contact with a porous separation membrane of polar material are disclosed which exhibit relative preferential permeation of polar gases from mixtures containing polar and non-polar gases.

13 Claims, 9 Drawing Figures

MULTICOMPONENT GAS SEPARATION MEMBRANES HAVING POLYPHOSPHAZENE COATINGS

BACKGROUND OF THE INVENTION

This invention relates to improved multicomponent membranes for gas separations having polyphosphazene coatings in occluding contact with a porous separation membrane wherein the improvement is in stability of the multicomponent membrane when exposed to aromatic and aliphatic hydrocarbons contained in gaseous mixtures. In another aspect the invention relates to gas separation membranes comprised of polyphosphazene polymers and copolymers which when combined with porous separation membranes of polar materials result in a multicomponent membrane exhibiting relative preferential permeation of polar gases from non-polar gases.

The separating, including upgrading or the concentration of at least one gas from a gas mixture, is an essentially important procedure in view of demands on the supplies of chemical feedstocks. Frequently these demands are met by separating one or more desired gases from gas mixtures and utilizing the product for processing. Applications have been made employing separation membranes for selectively separating one or more gases from gas mixtures. To achieve selective separation, the membrane exhibits less resistance to transport of one or more of the gases than of at least one other gas in the mixture. Thus, selective separation can provide preferential depletion or concentration of one or more desired gases in the mixture with respect to at least one other gas and, therefore, provide a product having a different proportion of the one or more desired gases to at least one other gas than the proportion in the feed mixture. However, in order for selective separation of the one or more desired gases by the use of separation membranes to be commercially attractive, the membranes must satisfy several criteria so that the use of the separation procedure is economically attractive. For instance, the membranes must be capable of withstanding the conditions to which they may be subjected during the separation operation. The membranes also must provide an adequately selective separation for one or more desired gases at a sufficiently high flux, that is, permeation rate of the permeate gas per unit surface area. Thus, separation membranes which exhibit adequately high selective separation but undesirably low fluxes, may require such large separating membrane surface area that the use of these membranes is not economically feasible. Similarly, separation membranes which exhibit a high flux but low selective separation are also commercially unattractive. Accordingly, work has continued to develop gas separation membranes which can provide both an adequately selective separation of one or more desired gases, for example, polar gases from non-polar gases at a sufficiently high flux for an extended period of time under adverse environmental conditions such that the use of these gas separation membranes is economically feasible.

In general, the passage of fluids such as gases through a membrane may proceed through pores, i.e. continuous channels for gas flow in communication at both feed and exit surfaces of the membrane which pores may or may not be suitable for separation by Knudsen flow and diffusion; in another mechanism, in accordance with current views of membrane theory the passage of a gas through the membrane may be by interaction of the gas with the material of the membrane. In this latter postulated mechanism, the permeability of a gas through a membrane is believed to involve dissolution of the gas in the membrane material and the diffusion of the gas through the membrane. The permeability constant for a single gas is presently viewed as being the product of the solubility and diffusivity of the gas in the membrane. A given membrane material has a particular permeability constant for passage of a given gas by the interaction of the fluid with the material of the membrane. The rate of permeation of the gas, i.e. flux, through the membrane is related to the permeability constant, but is also influenced by variables such as membrane thickness, partial pressure differential of the permeate gas across the membrane, the temperature and the like.

Polymers useful as practical membranes for gas separation applications must satisfy a number of stringent criteria. Foremost among requirements are the polymers intrinsic transport properties such as permeability and selectivity. Additional requirements include adequate thermal and chemical-environmental stability and appropriate properties such as solubility characteristics which are crucial to the fabrication of the polymer into useful membranes. At present, most polymers which have been utilized for gas separations belong to the general family known as glassy polymers. For the most part, these materials are attractive because they satisfy very well the above criteria for fabrication into useful membranes in the asymmetric morphology either as film or hollow fiber. However, many polymers which satisfy fabrication criteria possess transport properties which are less than ideal for a given separation application. Frequently polymers which exhibit a desirably high selectivity for a particular gas pair do not allow the faster gas to permeate at an adequate rate. Conversely, polymers with very high permeabilities for a given gas, often are only moderately selective. It is a difficult task to find a single material which will simultaneously satisfy most or all of the necessary requirements for the desired gas separations.

Glassy polymers are generally highly amorphous materials, which are, as their name implies, in a frozen state at ambient temperatures. Above the glass transition temperature or $T_g$ of the polymer, the glass solid changes into another amorphous solid state, a rubber which then is characterized by much more rapid motion on the molecular scale of the polymer chains. Of particular interest among the various properties which distinguish polymers in the rubbery state versus the glassy state is that the transport properties are often drastically different for the two types of materials. Permeabilities for gases through many rubbers are very high compared to permeabilities of the same gases in many glassy polymers. However, the more dynamic nature of the polymer chains in the rubbery state, which is generally responsible for the higher permeabilities, often causes much lower selectivities for rubbery polymers as compared to many glassy polymers. In addition, many rubbery polymers do not possess an appropriate combination of other properties required for efficient fabrication into membranes having the preferred asymmetric morphology.

Some rubbery polymers have been and are being used in gas separations. Silicone rubbers have been applied to air ($O_2/N_2$) separations, particularly for small scale uses such as blood oxygenation or air oxygen enrichment. In such a circumstance, it is the very high $O_2$ permeability of silicone rubbers which outweighs less attractive properties, such as low selectivity and mechanical weakness. Since the silicone rubbers cannot readily be made in asymmetric form, the polymer is supported typically on a relatively strong porous support. Such porous supports can in appropriate applications effectively circumvent a rubbery polymer's limitations regarding fabrication and mechanical strength. For large scale gas separation applications of potential commercial importance, it remains, however, that the usually inadequate selectivity characteristics of most rubbery polymers limit their practical utility.

An exception to the inadequate commercial potential for such rubbery polymers is found in teachings of Henis, et al and U.S. Pat. No. 4,230,463 which pertains to particular multicomponent membranes for gas separations, comprising a coating which can be rubbery, in contact with a porous separation membrane, wherein the separation properties of the multicomponent membranes are principally determined by the porous separation membrane as opposed to the material of the coating. Such multicomponent membranes for the separation of at least one gas from a gaseous mixture can exhibit a desirabe selectivity and still exhibit a useful flux. Moreover, such multicomponent membranes for gas separation can be fabricated from a wide variety of gas separation membrane materials allowing great latitude in selecting such a membrane material which is advantageous for a given gas separation. The desired combination of flux and selectivity of separation can be provided by the appropriate configuration, method of preparation and combination of the components. For instance, a material having high selectivity of separation, but a relatively low permeability constant, can be utilized to provide multicomponent membranes having desirable permeation rates with desirable selectivity.

The present invention provides improved multicomponent membrane exhibiting improved stability when exposed to aromatic and aliphatic hydrocarbons contained in gaseous feed mixtures when the coating in occluding contact with the porous separation membrane is comprised of polyphosphazene. When the material of the porous separation membrane is polar, the resulting multicomponent membrane of polyphosphazene coating and the polar material porous separation membrane exhibit relative preferential permeation of polar gases from non-polar gases.

Polyphosphazenes are polymers having a phosphorous-nitrogen sequence with organic substituents on the phosphorous as follows:

where R and R' are the same or different organic substituents and n is an inteqer of ten or more.

A limited number of single gas transport measurements of polyphosphazenes has been made. For instance, Bittirova, et al, Vysokomol. Soedin, Ser. B, 23(1), 30–3 (1980) discloses the permeability to oxygen, nitrogen and argon of poly(octyloxy phosphazene). The Bittirova, et al reference focuses on one polyphosphazene with particular interest in the material because of its "specific properties" including the translucent, flexible, elastic films having permeability coefficient values for $O_2$, Ar, $N_2$ of $12.84 \times 10^{-7}$, $11.88 \times 10^{-7}$ and $5.25 \times 10^{-7}$, $cm^3.cm/cm^2.s.atm$, respectively. The reference makes no attempt to qualify the elastic films further with regard to other gas transport properties or mixed gas separations.

Kireyev et al, Vysokomol. Soedin, Ser. A18(1), 228 (1976) and Chattopadhyay, et al, J. Coating Technology, 51 (658), 87 (1979) disclose water vapor permeability in poly(butyloxy phosphazene) and in poly(aryloxy phosphazenes) respectively. Kireyev, et al discusses the need for new types of elastomers; thus, the interest in polydiorgano phosphazenes (one of the qualifying physical property studies relates to the absorption of steam by these phosphazenes as examined gravimetrically). Chattopadhyay, et al provides a publication entitled "Polyphosphazenes As New Coating Binders" with special interests in the polyaryloxy phosphazenes as a material having a high degree of flame retardancy and other desirable polymeric properties for application as paint binders. The Chattopadhyay, et al reference along with other physical test evaluations indicate moisture vapor transmission through the polymeric film at 25° C. No mention of separation of gas or fluid mixtures by polyphosphazene membranes has been made.

In summary, gas separation membranes comprised of polyphosphazenes have not been provided. Particularly, neither improved multicomponent membranes having polyphosphazene coatings which provide improved stability against hydrocarbon swelling, nor the suitability of such multicomponent membranes for enhanced permeation of polar gases from non-polar gases have been provided.

SUMMARY OF THE INVENTION

Various hollow fiber separation membranes comprised of polysulfone, polyimide, brominated polyphenylene oxides and polyphenylene oxide were coated with polyphosphazenes and for comparision purposes with polysilicone coatings. Coating performance of these two rubbery coating polymers was examined using hydrogen/methane and carbon dioxide/methane mixed gas tests at ambient temperature and low pressure. Comparative tests illustrated that the polyphosphazene coated hollow fiber membranes showed significant advantages over the same hollow fiber separation membrane when coated with polysilicone. Better gas transport properties for the polyphosphazene coated hollow fiber separation membranes included higher permeabilities for hydrogen and carbon dioxide and higher carbon dioxide/methane selectivities when utilizing polyimide hollow fibers and higher carbon dioxide/methane selectivity being demonstrated with lightly crosslinked brominated polyphenylene oxide. Higher carbon dioxide permeabilities were also observed with highly crosslinked brominated phenylene oxide hollow fiber separation membranes when coated with polyphosphazene as compared to those coated with polysilicone rubbers. Several instances were encountered where there appeared to be instability with the polysilicone coatings; however, no such stability problems were evidenced for the polyphosphazene coated hollow fibers. Polyphosphazenes exhibit higher thermostability and higher resistance to solvation and swelling effects of aliphatic and aromatic hydrocarbons which in general provide improved multicomponent membranes for gas separations according to the invention. Polysilicone based polymers are considerably more sensitive to property degradation by such contaminants found in typical separation gas streams. Polysilicones are generally soluble in hydrocarbons.

Enhanced carbon dioxide permeabilities and $CO_2/CH_4$ selectivities, when utilizing polyphosphazenes with crosslinked membranes and/or with membranes comprised of polar materials, provide a second aspect of the invention. This feature of the invention is based on observations from experimentation that polyphosphazene coated multicomponent membranes for gas separations exhibit relative preferential permeation for polar gases from non-polar gases.

DEFINITION OF TERMS

In the description of the present invention the following definitions are used.

The term "fluid" as used in this application means a form of matter that cannot permanently resist any shearing force which causes flow such as: a gas, e.g., a conditon of matter in which the molecules flow apparently without resistance; and a liquid, e.g., a condition of matter in which the molecules move freely but are restrictive by gravitation. The term fluid can also include a mixture of gases and liquids.

The term "polar fluid" as used in this application means those fluids capable of ionizing or functioning as an electrolyte as opposed to a non-electrolyte, or fluids characterized by such properties as relatively high dielectric constants or molecular dipole moments.

The term "membrane" as used in this application refers to material having surfaces which can be contacted with a fluid and/or gas mixture such that one fluid or gas of the mixture selectively permeates through the material. Such membrane can generally be disposed in film- or hollow fiber- form. Membranes can be porous, or essentially pore-free, or have layers that are porous and layers that are essentially pore-free. This invention provides membranes exhibiting advantageous gas separation properties for polar gases. However, the membranes of this invention will exhibit useful fluid and/or gas separation properties other than for polar fluids.

The term "polar membrane" as used in this application means those fluid separation membranes comprised of materials or polymers capable of ionizing or those which can be characterized by such properties as relatively high dielectric constants or molecular dipole moments. In addition such materials generally have relatively high solubility parameters, for example, from about 9 to 10 or higher.

The term "dense", or "dense film", membranes as used in this application means membranes which are essentially free of pores, i.e., fluid channels communicating between surfaces of the membrane, and are essentially free of voids, i.e. regions within the thickness of the membrane which do not contain the material of the membrane. Since a dense membrane is essentially the same throughout the structure, it falls within the definition of isotropic membrane. Although some thick dense membranes are very selective, one of their disadvantages is low permeate flux due to the relatively large thicknesses associated with such membranes. Dense membranes are useful in determining intrinsic gas separation properties of a material. Intrinsic separation properties include separation factor $a$, and permeability constant, P, both of which are defined below.

The term "asymmetric" or "anisotropic" membranes as used in this application means membranes which have a variable porosity across the thickness of the membrane. Exemplary of an asymmetric membrane is what is called the Loeb membrane, which is composed of two distinct regions made of the same material, that is, a thin dense semi-permeable skin and a less dense, void-containing support region. However, an asymmetric membrane does not necessarily have the thin dense semi-permeable region on an outer surface or skin.

The membranes of this invention comprise materials in film- or hollow fiber- form which have particular separation relationships. Some of these relationships can conveniently be stated in terms of relative separation factors with respect to a pair of gases for the membranes. A membrane separation factor ($a_{a/b}$), for example, for a given pair of gases (a) and (b) is defined as the ratio of the permeability constant ($P_a$) for the membrane for a gas (a) to the permeability constant ($P_b$) of the membrane for gas (b). The permeability for a given gas is the volume of gas at standard temperature and pressure (STP), which passes through a membrane per square centimeter of surface area, per second, for partial pressure drop of one centimeter of mercury across the membrane per unit of thickness, and is expressed in units of ($P = cm^3$-cm/cm$^2$-sec.-cmHg). A separation factor is also equal to the ratio of permeability $(P/l)_a$ of a membrane of thickness (l) for a gas (a) of a gas mixture to the permeability of the same membrane for gas (b), $(P/l)_b$ $(P/l = cm^3/cm^2$-sec-cmHg).

In practice, the separation factor with respect to a given pair of gases for a given membrane can be determined employing numerous techniques which provides sufficient information for calculation of permeability constants or permeabilities for each of the pair of gases. Several of the many techniques available for determining permeability constants, permeabilities and separation factors are disclosed by Hwang, et al *"Techniques of Chemistry, Vol. VII, Membranes In Separations,* John Wiley & Son (1975) (herein incorporated by reference) at Chapter 12, pages 296–322.

"Polyphosphazenes" as used in this application represent a composition of matter having a repeating structural unit of the formula:

where R and R' are the same or different organic substituents and n is an integer of two or more.

Specific polyphosphazenes as used in this application represent a composition of matter having a repeating structural unit of the formula:

where Y and Y' can be the same or different and selected from oxygen, nitrogen or sulfur and where R and R' can be the same or different and selected from substituted alkyl, aryl, and substituted aryl, alkyl, and n is an integer of from about 100 to about 70,000. Preferred polyphosphazenes are alkoxy, substituted alkoxy, aryloxy and substituted aryloxy groups wherein the R and R' can be the same or different and contain from 1 to about 25 carbon atoms.

As an example, substituted polyphosphazenes as used in this application represent a composition of matter having a repeating structural unit of the formula:

where n is an integer of from about 100 to about 10,000 or more, ORX and OR'X' each represent a halogenated alkoxy or halogenated aryloxy where R and R' can be the same or different with from 1 to about 25 carbon atoms, X and X' can be the same or different halogens.

The term "crosslinked polymer" as used in this application means that polymer chains are bonded to one another. The fact that the polymer is stable, that is, does not dissolve in normal solvents for uncrosslinked polymer is indictive of crosslinking.

DESCRIPTION OF A PREFERRED EMBODIMENT

This invention provides for improved multi-component membranes for gas separations having polyphosphazene as homo- and copolymers as coatings for the multicomponent membranes which exhibit improved stability when exposed to aromatic and aliphatic hydrocarbons contained in gaseous feed mixtures. Gas transport and separation properties of a variety of polyphosphazene coated multicomponent membranes have been found to be highly selective and permeable for polar gases such as $H_2S$ and $CO_2$ from a gas stream containing for example $H_2S$, $CO_2$ and $CH_4$. Specifically multicomponent membranes for gas separations having a polyphosphazene coating in occluding contact with a porous separation membrane of polar material have been found to exhibit relative preferential permeation of polar gases from mixtures containing polar and non-polar gases. For example, polyphosphazene as coatings for polyimide hollow fiber separation membranes are a preferred combination for the multicomponent membranes which exhibit improved stability, preferential selectivity and permeation for polar gases from polar/non-polar gas mixtures.

FORMATION OF POLYPHOSPHAZENES

Polyphosphazenes can be synthesized to give soluble, high molecular weight (normally greater than one million), linear chain material. Thermal polymerization of trimeric cyclo-phosphonitrylic chloride monomer yields a high molecular weight (—PN—) skeleton which has two chlorines on each phosphorous. This poly(dichloro)phosphazene is the base polymer from which all soluble polyphosphazene rubbers are made by subsequent nucleophilic displacement reactions. Typically, the sodium salt of an alcohol is used to displace chlorine on phosphorous and substitute the —O—R group in its place, as shown below:

Copolymers are synthesized by using a mixture of alcoholate salts. Nitrogen rather than oxygen containing side groups linked to the phosphorous backbone atoms are made by use of amines in place of Na—OR salts in an exchange reaction. Typically polyphosphazenes with —OR side groups on the phosphorous are more thermally and chemically stable, for example to hydrolysis, than those with —NR_2 groups.

Multicomponent gas separation membranes comprised of polyphosphazene coatings have been found to possess unexpectedly attractive combinations of permeability and selectivity for polar/non-polar gas separations. These polyphosphazene coated multicomponent membranes also have significantly improved thermal and chemical stability. Gas transport properties and physical/chemical properties of halogenated polyphosphazene coatings indicate that this class of rubbery polymers have significant potential for utility in practical polar/non-polar gas separations on a large scale. Especially noteworthy is the $CO_2$ permeabilities from methane containing mixed gas streams utilizing halogenated polyphosphazenes. The poly(fluoro-alkoxy) polyphosphazene coated multicomponent membranes produced high permeabilities for $CO_2$ which were accompanied by unexpectively high $CO_2/CH_4$ separation factors when the separation membrane is comprised of polar materials.

The various polyphosphazene coatings utilized for multicomponent gas separation membranes are rubbery materials with $T_g$ well below room temperature. These polyphosphazenes are soluble generally in polar organic solvents such as tetrahydrofuran (THF), methanol, acetone, ethyl acetate, methylethylketone (MEK), dimethylformamide (DMF), dimethylacetamide (DMAC), formyl piperidine, N-methyl pyrrolidone and the like. Polyphosphazenes having aryl side groups are also soluble in aromatic hydrocarbons, such as toluene and benzene. The latter solvents have little swelling impact on polyphosphazenes which are halogenated on the alkyl side groups. While the poly(fluoro-alkoxy)-phosphazenes are readily soluble in methanol, these polyphosphazenes are only sparingly soluble in high alcohols, for example, less than one percent in isopropyl alcohol at up to about 70° C. Various polyphosphazene coatings were evaluated in multicomponent separation membranes including those with side groups comprised of halogenated alkoxy and aryloxy as well as copolymers thereof, for example, poly(bis-phenoxy)phosphazene; copoly(phenoxy, P-ethyl phenoxy)phosphazene; poly(bis-trifluoroethoxy) phosphazene and the like. A copolymer of phosphazene with fluorinated alkoxy side groups on the chain backbone of phosphorous atoms was evaluated with results related to those results produced with poly(bis-trifluoroethoxy)phosphazene. Overall side group composition of the mixed perfluorinated alkoxy copolymer, was about 65% —O—CH_2—CF_3, about 35% —O—CH_2—(CF_2)_n—CHF_2 where n is equal to 1, 3, 5, 7, 9 and greater; the copolymer also containing 0.5 unsaturated functionality in the side groups, which can be crosslinked by various vulcanizing agents such as peroxides or sulfur.

Experimental comparisons of poly (fluoro-alkoxy)-phosphazene with polysilicone coatings on various types of hollow fiber separation membranes including polysulfone, polyimide, and crosslinked brominated polyphenylene oxide, resulted in comparable performance in some cases; however, in certain instances the separation properties of the polyphosphazene coated hollow fibers were found to be significantly better than those of fibers coated with the polysilcones.

Notable examples included higher hydrogen (200%) and carbon dioxide (300 to 400%) permeabilities and 300% improvements in carbon dioxide/methane selectivity for the polyphosphazene coatings on polyimide hollow fiber separation membranes. Improved carbon dioxide/methane selectivity of about 150% resulted from the multicomponent membranes comprised of polyphosphazenes on slightly crosslinked brominated polyphenylene oxide and approximately 200% improvement for carbon dioxide permeability for polyphosphazene coated substantially crosslinked brominated polyphenylene oxide. Several instances were encountered where separation performance of a polysilicone coating declined with time to the extent that recoating was necessary. In no case was recoating required when utilizing the polyphosphazene coatings. Polyphenylene oxide hollow fiber membranes coated with polyphosphazenes carried in a methanol coating solution provided hydrogen/methane selectivities comparable to polyphenylene oxide intrinsic properties. Specifically the polyphenylene oxides utilized were polymers of 2,6-dimethyl-1,4-phenylene oxide. Unfortunately attempts to coat polyphenylene oxide hollow fiber membranes using polysilicones in a pentane solution damaged the hollow fiber separating layer resulting in low selectivity.

Poly(fluoro-alkoxy)phosphazenes have been found to possess high thermal stability and are relatively unaffected by chemical vapors commonly encountered into some gas separation applications, for example, aliphatic and aromatic hydrocarbons. Polysilicone rubber coatings are well known to swell as much as 140% when immersed in liquid toluene, while under the same conditions the polyphosphazenes swell only about 15%. Such stability properties provide the polyphosphazenes as improvement upon multicomponent membranes for gas separations.

Multicomponent membranes for gas separations utilizing phosphazene coatings according to this invention were obtained by coating pre-existing hollow fiber membranes from solvent solutions. Freshly prepared coating solutions of approximately 1% weight/volume were employed. The polysilicone coatings were prepared in normal-pentane solvent as a prepolymer solution which contains amino-functional crosslinking agents and catalysts utilized for polymerizing the silicone upon application of the coating. The polyphosphazene solution was in methanol solvent.

The polymeric hollow fiber separation membranes employed included polysulfone hollow fibers which had uncoated performance levels of about 76 standard units for P/l for hydrogen and 3.9α for hydrogen/methane (average of five different test bundles). In addition, polyimide hollow fibers, having uncoated fiber performance of P/l for hydrogen of approximately 59 standard units and a hydrogen/methane selectivity of 38 (average of three bundles) were utilized in combination with the polyphosphazene coatings. Brominated polyphenylene oxide hollow fiber separation membranes which were lightly crosslinked at room temperature by immersion in concentrated aqueous ammonia for twenty-four hours and then washed in de-ionized water for twenty-four hours, ambient air dried for at least sixty hours, were also utilized as hollow fiber separation membranes in combination with polyphosphazenes to comprise a multicomponent separation membrane. Additional brominated polyphenylene oxide hollow fiber separation membranes were substantially crosslinked by immersion in concentrated aqueous ammonia at 100° C. for at least twenty-four hours. All hollow fiber separation membranes were immersed in coating solutions as the means for coating whether for silicone or polyphosphazene application. Data related to these multicomponent membranes is illustrated in the table and figures.

Mixed gas testing was conducted using standard techniques as identified by Hwang, et al "Techniques of Chemistry". Typically, 25/75% by volume composition feeds of hydrogen/methane and carbon dioxide/methane were used, with total pressures of the feed being between about 20 and 80 psig. All tests were run at ambient temperature. Prior to coating or solvent treating, all bundles were tested for gross air flux rates and for hydrogen/methane separation performance. Following coating application or solvent treatment, test bundles were allowed to dry for normally about three to six hours prior to subsequent gas testing. During this drying period, vacuum was applied to the fiber bore while the external surface of the fiber was exposed to ambient air.

Following the initial drying period, bundles were tested for hydrogen/methane separation, then allowed to dry further (bore vacuum/air), typically overnight prior to subsequent testing. In most instances, hydrogen/methane testing was repeated, at roughly twenty-four hours, three days, nine days and about 15 days after application of the coatings. In all cases, carbon dioxide/methane tests were delayed until at least twenty-four hours after coating application. As with hydrogen/methane, tests for carbon dioxide/methane separation were repeated at three days, about ten days and then about twenty-five days after coating application. Some tests were carried out to as long as fifteen days postcoating.

Silicone coatings showed in some cases drastic declines in separation factor as time elapsed after coating. In these instances, the bundles were recoated and retested as before. None of the polyphosphazene coated bundles needed recoating.

For each of the various hollow fiber separation membranes examined (except polyphenylene oxide) the time behavior after coating of hydrogen/methane and carbon dioxide/methane separation properties is presented graphically in FIGS. 2 through 5. In the case of polyphenylene oxide, the more limited tests comparing the silicone/pentane and polyphosphazene/methanol coatings are presented in the Table.

TABLE

Polyphosphazene Oxide (PPO) Hollow Fiber:
Coating Comparison silicon/n-pentane vs. polyphosphazene/methanol

| Bundle | P/1 $H_2$ ($\times 10^{-6}$) | $H_2$ $CH_4$ | P/1 $CH_4$ ($\times 10^{-6}$) | Comments |
|---|---|---|---|---|
| | Uncoated | | | |
| −2 | 137. | 14.2 | 9.65 | Uncoated |
| −3 | 129. | 9.54 | 13.5 | Uncoated |
| −5 | 184. | 12.7 | 14.5 | Uncoated |
| −1 | 170. | 8.92 | 19.1 | Uncoated, untreated |
| −4 | 138. | 8.62 | 16.0 | Uncoated, untreated |
| | Coated | | | |
| −2 | 112. | 12.5 | 8.96 | hrs. after 1% silicone/n-pentane coating |
| | 79.2 | 12.3 | 6.44 | 3 days after 1% silicone/n-pentane coating |
| −3 | 101. | 8.10 | 12.5 | 2 hrs. after 1% silicone/n-pentane coating |
| | 74.1 | 7.58 | 9.78 | 3 days after 1% silicone/n-pentane coating |
| −5 | 142. | 13.2 | 10.8 | 3 hrs. after 1% silicone/n-pentane coating |
| | 102. | 15.0 | 6.8 | 3 days after 1% silicone/n-pentane coating |
| −1 | 143. | 13.4 | 10.7 | 21 hrs. after methanol solvent treatment |
| | 117. | 24.1 | 4.85 | 24 hrs. after 1% polyphosphazene/methanol coating |
| | 123. | 18.3 | 6.72 | 4 days after 1% polyphosphazene/methanol coating |
| −4 | 125. | 12.9 | 9.69 | 21 hrs. after methanol solvent treatment |
| | 103. | 24.9 | 4.14 | 24 hrs. after 1% polyphosphazene/methanol coating |
| | 108. | 21.9 | 4.93 | 4 days after 1% polyphosphazene/methanol coating |

Note:
1. Coating and solvent-only treatments involve immersion of bundle for 15 seconds with bore vacuum applied to bundle.
2. Fiber bundles −1 through −5 used in present tests were about 1.5 years old
3. For comparison to the present results, freshly spun PPO fiber, tested in October, 1981 gave uncoated P/1 $H_2$ = 277. $\times 10^{-6}$ with a $H_2/CH_4$ = 21.

Figure 1:
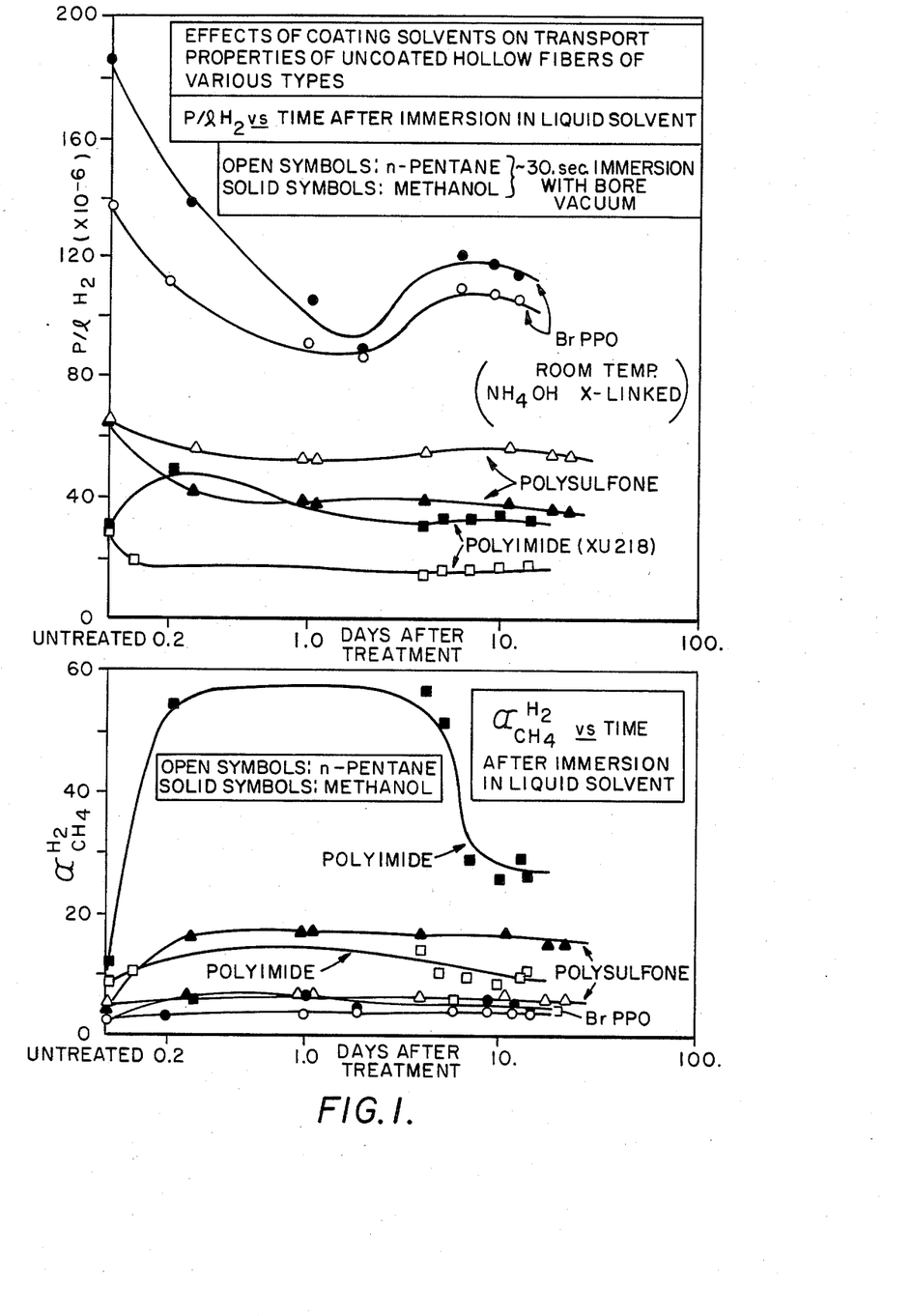

FIG. 1 shows the time behavior of polysulfone, polyimide and ammonia crosslinked brominated polyphenylene oxide (BrPPO) following solvent—only treatments in n-pentane and methanol. These data are for individual test bundles in each case. FIGS. 2a through 5a show the time behavior after coating for P/1 (hydrogen) and hydrogen/methane separation factor for polysulfone, polyimide and brominated PPO's, both the lightly crosslinked and the substantially crosslinked, respectively. FIGS. 2b through 5b show similar data for P/1 of carbon dioxide and carbon dioxide/methane separation factor for the respective hollow fiber membranes. In FIGS. 2 through 5, hollow fibers with the two different coatings are directly comparative. Data are displayed according to the bundle identification, where the figure caption indicates which bundles were coated with either silicone/n-pentane or polyphosphazene/methanol. Test data for bundles which require recoating with silicone/n-pentane are shown by the bundle number enclosed in a circle, with the test result obtained upon recoating plotted at a given time after the recoat was applied. That is, the time axis of the figure consistently zeros at the time of coating application, whether it was the initial or a repeating coating application.

In FIG. 1, solvent-only data are displayed as open symbols for bundles treated with n-pentane and as solid symbols for those bundles treated with methanol. After the bundles subjected to solvent-only treatment had been followed for the time indicated in FIG. 1, the same bundles were coated and tested as were bundles which received coatings initially. These solvent-only and subsequently coated bundles were then included in the data displayed in FIGS. 2 through 5. Data for the solvent-only treatment of the various hollow fiber membranes (FIG. 1) reveal in some cases rather significant differences between the solvents, n-pentane and methanol. In general, the fact that one solvent should exert a stronger effect than another on asymmetric hollow fiber membranes is to be expected, particularly comparing solvents with as widely different properties as hydrocarbons and alcohols. For example, the solubility parameter values of roughly 7 and 14.5 for n-pentane and methanol, respectively, provides one relevant indicator of such differences.

It has been observed that the affects of various chemicals on hollow fiber properties is related to their respective solubility parameters. For example, the closer the solubility parameter of the solvent and the polymer from which the hollow fiber is made, the higher the probability of damaging affects on fiber morphology and gas separation properties due to swelling or solvation of the polymer. Such effects are usually much more pronounced when the hollow fiber is exposed to solvent in the liquid state or in the gaseous state very near saturation vapor pressure. Obviously characteristics other than the one dimensional solubility parameter of the chemical also play a role in determining whether that chemical will swell, or in the extreme dissolve, the polymer. Specifically, it has been observed that with polysulfone hollow fibers, methanol has much stronger effect on polysulfone hollow fibers than does pentane, but that pentane swells and can destroy the effectiveness of silicone coatings. Data from FIG. 1 shows that both n-pentane and methanol effect hydrogen permeability and hydrogen/methane selectivity of uncoated fibers in most cases. However in some cases the effects are much larger than others. Generally, exposure to either solvent resulted in somewhat lower P/1 for hydrogen and higher hydrogen/methane separation factors. Methanol treated polysulfone hollow fiber was slower but more selective than either untreated polysulfone hollow fiber or pentane treated polysulfone hollow fiber. Pentane treatment did lower P/1 for hydrogen relative to untreated polysulfone fiber but selectivity for hydrogen/methane was essentially unchanged. For ammonia crosslinked BrPPO both solvents lowered P/l for hydrogen compared to untreated fiber, but neither solvent had much of an effect on selectivity after the first few days had lapsed. These crosslinked polymers would be expected to be more immune to solvation impact. For polyimide, solvent treatment resulted in large effects on transport properties compared with the other hollow fiber materials. Polyimide also showed greater differential effects comparing pentane and methanol solvent treatments. Pentane treatment lowered the P/l for hydrogen significantly, but after initial increase in hydrogen permeability following methanol treatment, P/l for hydrogen was essentially unchanged from that observed for untreated polyimide hollow fiber. Pentane treatment left hydrogen/methane selectivity roughly the same as untreated fiber, that is, after the treated fiber achieved a functional level after initially higher performance levels. Methanol, by contrast, appeared to cause a substantial increase in hydrogen/methane selectivity. The course of the time behavior of polyimide following methanol treatment is unusual, at least as regards hydrogen/methane separation factor. During the first five days after methanol treatment, gas tests showed hydrogen/methane selectivity at a level almost 500% greater than the untreated polyimide hollow fiber. Beyond post-treatment day five, a decline in selectivity was observed on subsequent testing. At and beyond post-treatment day seven hydrogen/methane selectivity seemed to stabilize at a lower level, still over twice the selectivity of the untreated polyimide fiber. Solvent only treatment for PPO was performed with methanol but not with n-pentane. As mentioned above, experience has indicated that PPO to be among the most sensitive of the various hollow fiber membrane materials to damaging effects of pentane exposure. Methanol treatment of PPO hollow fiber decreased P/l for hydrogen by about 30 to 40% and increased hydrogen/methane selectivity by roughly 50%. Generally the effect of methanol on PPO was similar to its effects on polysulfone.

Significant effects on fiber transport properties have been previously observed following chemical exposure. What is not expected though is the results achieved with relatively polar combinations of solvent and polymer, such as methanol and polyimide in using polyphosphazene coatings in the multicomponent gas separation membrane applications. In fact a small degree of physical swelling was visible during immersion of polyimide fiber in methanol solvent and coating solutions. In contrast, minor effects would be expected on crosslinked polymers, such as ammonia treated brominated PPO. While solvent-only treatment of ammonia crosslinked brominated PPO leaves hydrogen/methane separation factor unchanged, far from minor effects are observed with hydrogen permeabilities following treatment with both pentane and methanol (FIG. 1). Since substantially crosslinked brominated PPO was not subjected to solvent-only treatment there is no direct comparison on the two crosslinked brominated PPO hollow fibers. However, it is suspected that the light degree of crosslinking under room temperature reaction conditions used in the one fiber is insufficient to fully stabilize the fiber against the effects of solvents. Even with a small number of samples involved, the present test clearly indicate the potentially significant effects of solvents employed in coating applications. For example, methanol is detrimental to polysulfone performance and yet methanol is the solvent used for coating and/or dissolving polyphosphazenes when the polysulfone was coated. The data or polyphosphazene-polysulfone multicomponent membranes is questionable when regarding the overall affect of the combination of polyphosphazenes with a hollow fiber membrane material which is polar. Polysulfone has a solubility parameter i.e., one indication of polar behavior of about 10.15 to 11. Polyimide is also highly polar and as indicated by the results, very desirable for the separation of polar gases from non-polar gases when combined with polyphosphazenes in a multicomponent configuration.

Figure 2A:
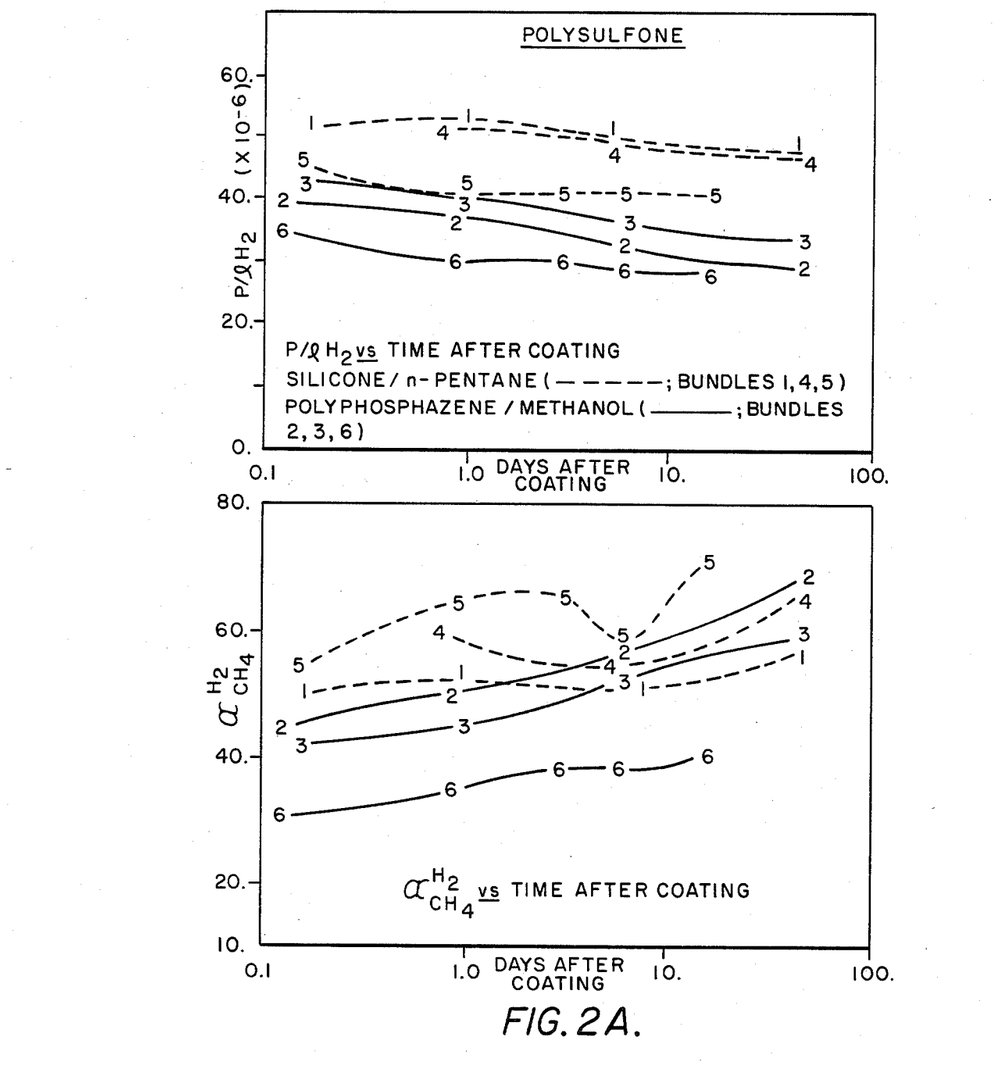
Figure 2B:
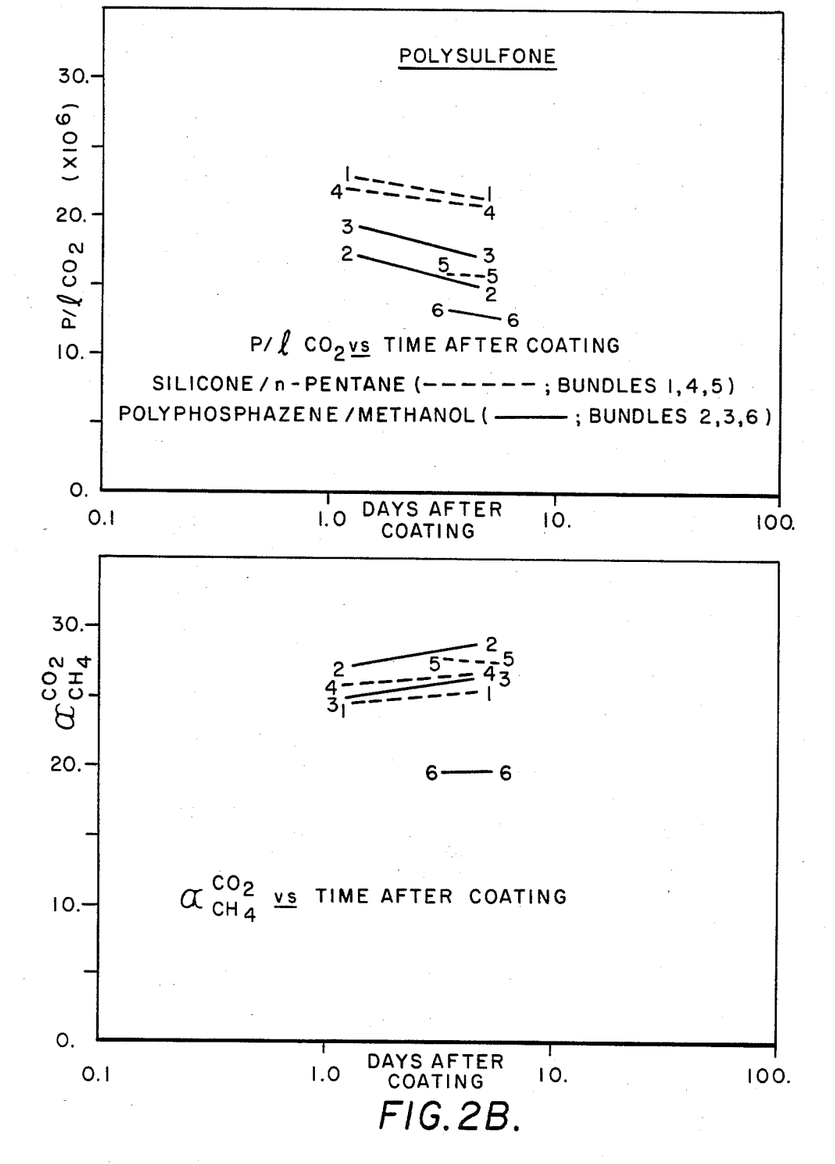

The results found in FIGS. 2a and b display test data for coated polysulfone hollow fibers for hydrogen/methane and carbon dioxide/methane, respectively. Bundles 1, 4 and 5 are silicone coated and 2, 3 and 6 are polyphosphazene ccated. Bundles 5 (pentane) and 6 (methanol) received solvent-only treatment prior to coating. Prior to solvent or coating treatment, all bundles exhibited roughly comparable separation properties for hydrogen/methane. P/l for hydrogen and P/l for carbon dioxide were roughly 30 to 40% higher for silicone versus polyphosphazene coated bundles. On average, hydrogen/methane and carbon dioxide/methane selectivities were the same for the two coatings. Permeability and selectivity appeared stable with time for both coatings in the present test. Bundle 6, which has been methanol treated prior to polyphosphazene methanol coating, tested consistently lower in permeability and selectivity than other polyphosphazene coated bundles; thus, reiterating the solvation degradation of polysulfone in the presence of methanol either as a pretreatment or as a coating carrier.

Figure 3A:
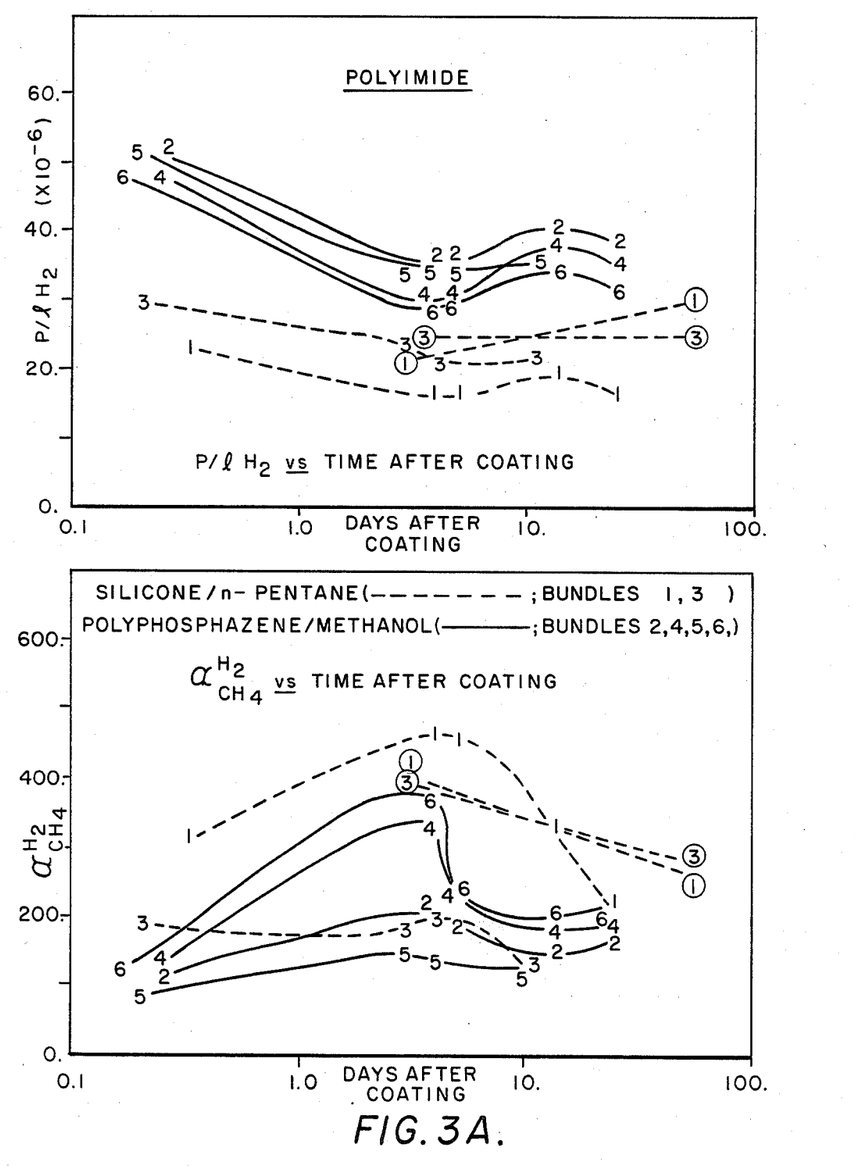
Figure 3B:
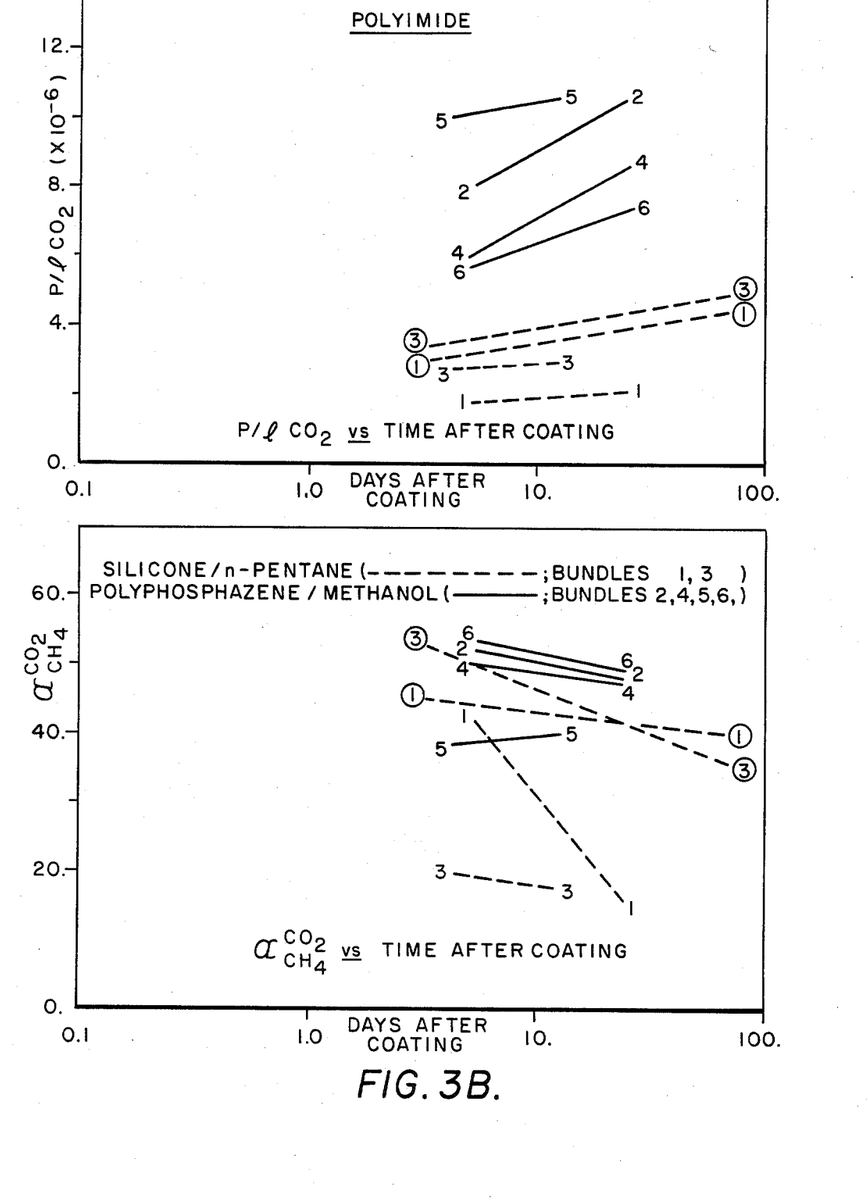

FIGS. 3a and b display results for polyimide hollow fibers for hydrogen/methane and carbon dioxide/methane test respectively wherein the silicone coated materials are identified as bundles 1 and 3 and the polyphosphazene multicomponent membranes are identified as bundles 2, 4, 5 and 6. Bundles 3 (pentane) and 5 (methanol) were solvent-only treated prior to coating. Untreated, uncoated hydrogen/methane properties were similar for all bundles examined. In contrast to results achieved with polysulfone, P/l for hydrogen and P/l for carbon dioxide were consistently higher about 200% for hydrogen and 300 to 400% for carbon dioxide for polyimide hollow fiber supples coated with polyphosphazenes/methanol as compared to those coated with silicone/pentane. Initially higher hydrogen/methane selectivity for a silicone coated polyimide declined with time to levels comparable to polyphosphazene coated hollow fibers. Carbon dioxide/methane selectivity for polyphosphazene/methanol coated polyimide was significantly higher (approximately 300%) compared to polyimide fiber coated with silicone/pentane.

Recoating with silicone had little effect on hydrogen or carbon dioxide permeabilities but restored selectivity for both separations. Prior solvent-only treatment, in the case of pentane (bundle 3), seemed to have little effect on coated hydrogen and $CO_2$ permeability, but appeared to result in somewhat lower selectivities. Prior methanol solvent treatment (bundle 5) had little effect on P/l for hydrogen but appeared to result in somewhat higher P/l for carbon dioxide and slightly lower selectivities for hydrogen/methane and carbon dioxide/methane, compared to polyphosphazene coated fiber which had not been previously solvent treated.

Figure 4A:
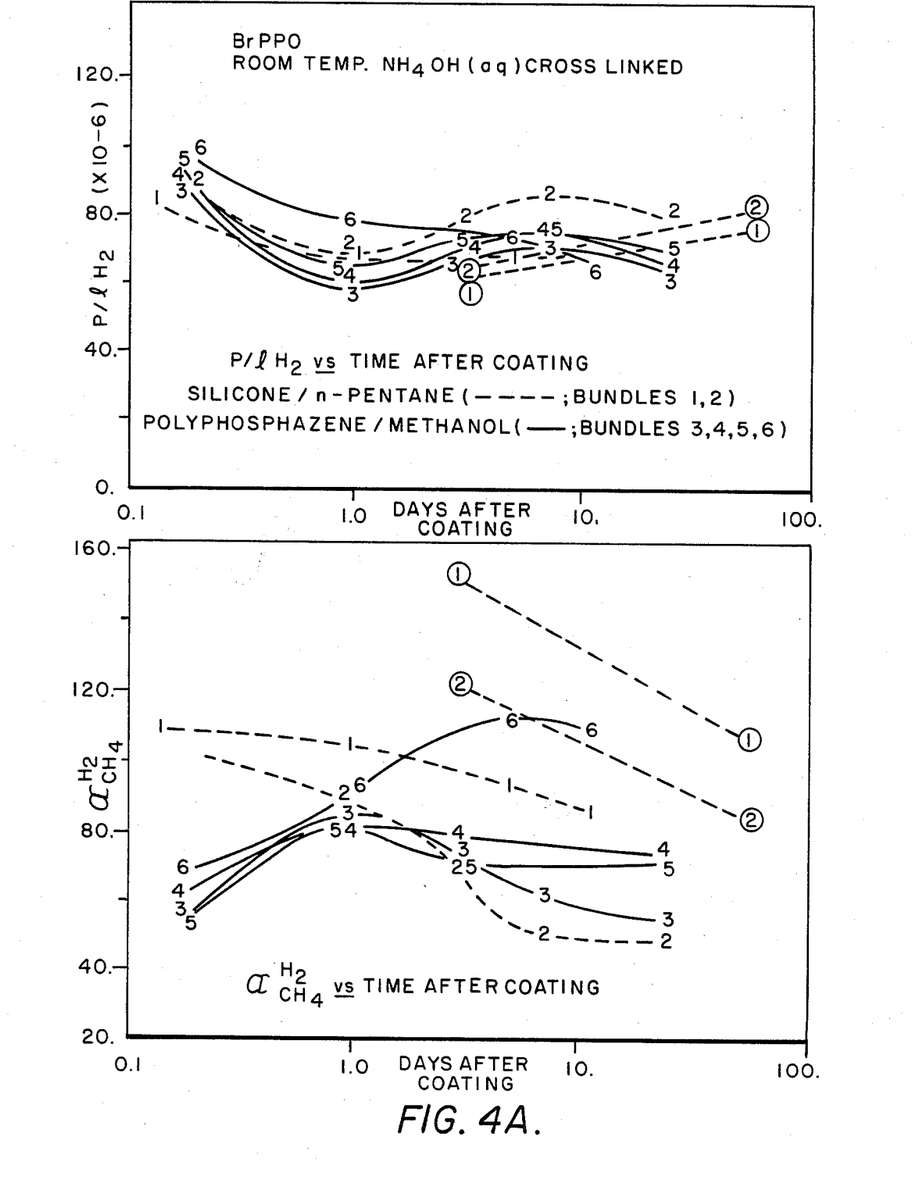
Figure 4B:
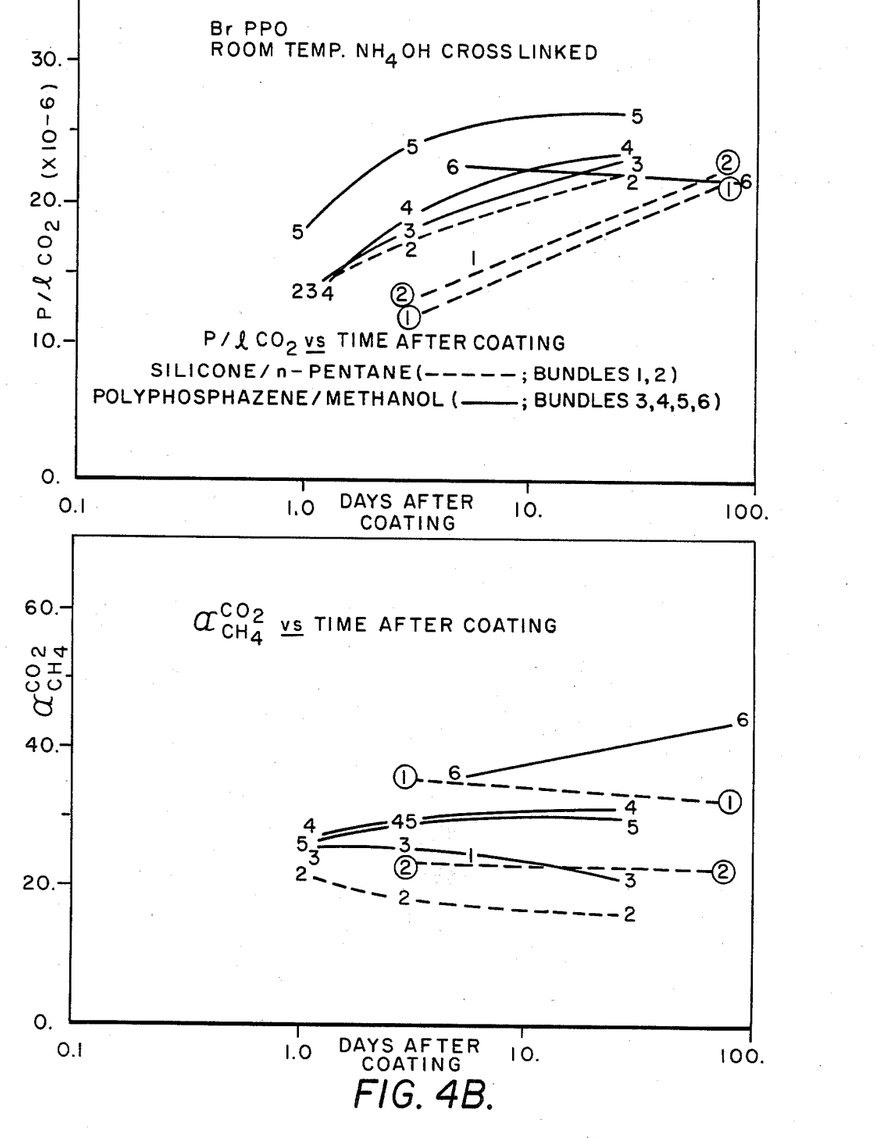

Lightly crosslinked brominated PPO, FIGS. 4a and b, displayed results for hydrogen/methane and carbon dioxide/methane respectively with silicone coated bundles 1 and 2 and polyphosphazene bundles 3, 4, 5 and 6. Bundles 1 (pentane) and 6 (methanol) were solvent-only treated prior to coating. Crosslinked, but untreated, uncoated hydrogen/methane transport properties were comparable for all bundles involved in these tests. Hydrogen and carbon dioxide permeabilities and hydrogen/methane selectivity were much the same for both coatings on this room temperature crosslinked brominated PPO hollow fiber. Carbon dioxide/methane selectivity appeared to be higher about 150% for fiber coated with polyphosphazene/methanol compared to silicone/pentane.

Figure 5A:
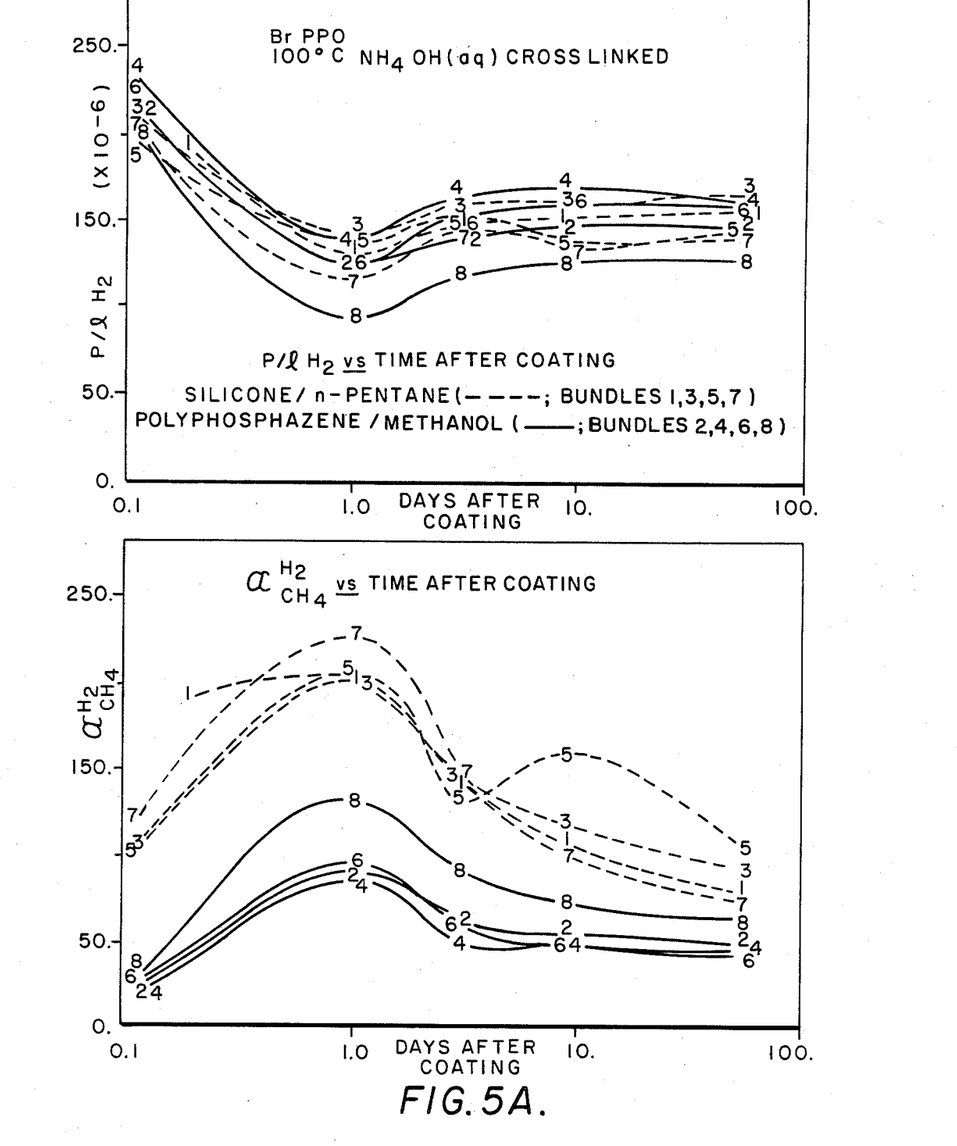
Figure 5B:
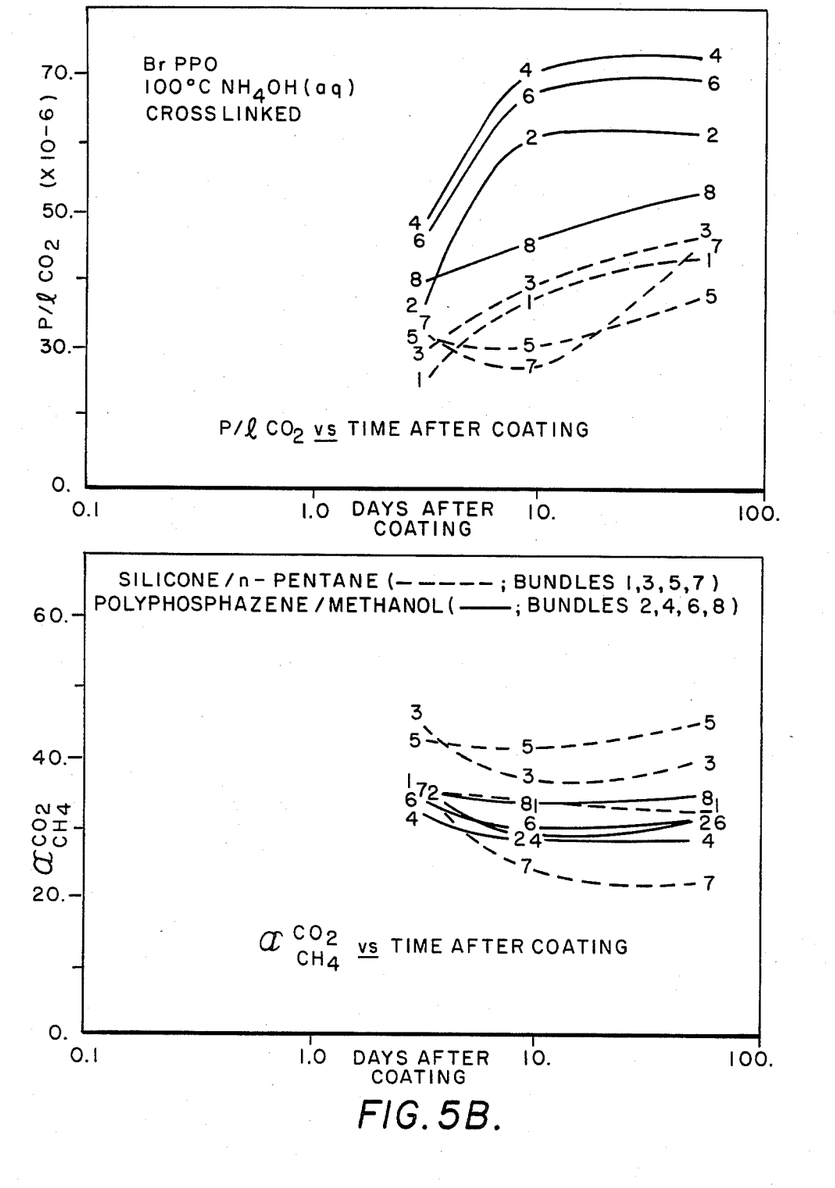

Substantially crosslinked brominated PPO, FIGS. 5a and b, displayed results for hydrogen/methane and carbon dioxide/methane, respectively, comparing coatings with silicone (bundles 1, 3, 5 and 7) and polyphosphazene (bundles 2, 4, 6 and 8). None of the highly crosslinked brominated PPO samples were subjected to prior solvent-only treatment. Crosslinked but uncoated hydrogen/methane transport properties were very similar for all ammonia crosslinked bundles. Hydrogen permeability and carbon dioxide/methane selectivity were much the same for both coatings. Silicone coating yielded fiber with roughly twice the hydrogen/methane selectivity as compared with polyphosphazene coating; however, P/l for carbon dioxide for the polyphosphazene/methanol coated crosslinked brominated PPO was almost twice that of the silicone/pentane coated fiber.

Hydrogen/methane test results for PPO fiber are displayed in the Table. Data illustrates that silicone/n-pentane is ineffective for this polymer hollow fiber. Generally hydrogen/methane selectivity either falls or fails to improve significantly after silicone/n-pentane coating. This result is in agreement with prior experience, that pentane often causes damage to the separating layer of PPO fiber. By contrast to the poor results obtained with silicone/pentane coating on PPO, polyphosphazene/methanol coated fibers exhibited hydrogen/methane selectivities very comparable to those exhibited by silicone carried in a more suitable solvent, cyclohexane for coating of PPO. In aggregate, these data suggest that the polyphosphazene coating performed comparable to silicone as a coating for PPO, and that methanol at least does not damage the fiber as does pentane.

Overall, the present results suggest that comparable or in some cases better fiber transport properties may be obtained using polyphosphazene/methanol as opposed to the silicone/n-pentane coatings, depending on the particular hollow fiber polymer. Most notable are the high hydrogen and carbon dioxide permeabilities and carbon dioxide/methane selectivity for polyphosphazenes/methanol on polyimide. The higher carbon dioxide/methane selectivity on lightly crosslinked brominated PPO and the higher carbon dioxide permeability for substantially crosslinked brominated PPO. Silicone coating appeared to have adavantage only for hydrogen and carbon dioxide permeabilities for polysulfone (30 to 40% higher than polyphosphazene coated fiber) and for hydrogen/methane selectivity for substantially crosslinked brominated PPO, where about two times the level of polyphosphazene coated fiber was observed. In addition, some fibers coated with silicone had to be recoated (polyimide and substantially crosslinked brominated PPO).

In certain separation applications, silicone based coatings can lose effectiveness. Particularly under the aggressive use environments, of elevated temperature and/or in the presence of significant feedstream contamination with aliphatic and aromatic hydrocarbons. On the other hand, polyphosphazenes such as poly(fluoro-alkoxy)phosphazenes appear to have stability even at elevated temperatures and in the presence of hydrocarbon contaminants. It has been found that upon immersion of the fluorinated polyphosphazenes in liquid toluene at room temperature, polydimethylsiloxane rubbers swell 140% at equillibrium while the polyphosphazene material swells only 15%. After immersion for seven days in JP4 jet fuel (kerosene fraotion hydrocarbons) at 110° C., the polyphosphazene material had swelled only 9%. Thermal-mechanical testing reveals that the polyphosphazenes retain better than 50% of their ultimate tensile strength at 150° C., compared to only about 25% retention observed for fluorosilicone elastomers. In addition, the application of known crosslinked chemistry for polyphosphazenes should further broaden the utility, particularly in rather aggressive environments encountered in some separation applications.

We claim:

1. In a multicomponent membrane for gas separation comprising a coating in occluding contact with a porous separation membrane of material, which material exhibits selective permeation of at least one gas of a gaseous mixture over that of one or more remaining gases of a gaseous mixture, said porous separation membrane having a substantial void volume, wherein, with respect to one pair of gases, the material of the porous separation membrane exhibits a determined intrinsic separation factor greater than the determined intrinsic separation factor of the material of said coating, and the multicomponent membrane exhibits a separation factor significantly greater than the determined intrinsic separation factor of material of said coating and greater than the separation factor exhibited by the porous separation membrane; the improvement comprising a polyphosphazene coating material having the formula:

where R and R' are the same or different organic substituents and n is an integer of two or more, said polyphosphazene coating material swells no more than about 25% by volume when exposed to aliphatic and aromatic hydrocarbons contained in said gaseous mixture.

2. The improved multicomponent membrane for gas separation according to claim 1 wherein the coating material is comprised of polyphosphazenes having a repeating structural unit of the formula:

where Y and Y' can be the same or different and are selected from oxygen, nitrogen or sulfur and R and R' can be the same or different and are selected from alkyl, aryl, substituted alkyl and substituted aryl with n being an integer of from about 100 to about 70,000.

3. The improved multicomponent membrane for gas separation according to claim 2 wherein the Y and Y' are both oxygen.

4. The improved multicomponent membrane for gas separation according to claim 3 wherein the polyphosphazene coating material swells no more than about 15% by volume when exposed to aliphatic and aromatic hydrocarbons contained in the gas mixture.

5. The improved multicomponent membrane for gas separation according to claim 3 wherein R and R' are substituted with halogens.

6. The improved multicomponent membrane according to claim 5 wherein the R and R' are substituted with fluorine.

7. The improved multicomponent membrane for gas separation according to claim 1 wherein with respect to at least one pair of gases consisting of one of hydrogen, helium, ammonia, carbon dioxide and hydrogen sulfide and one of carbon monoxide, nitrogen, argon, methane, ethane and propane, the multicomponent membrane exhibits a separation factor significantly greater than the determined intrinsic separation factor of the polyphosphazenes and greater than the separation factor exhibited by the porous separation membrane.

8. A multicomponent membrane for polar gas separations comprising a halogenated polyphosphazene coating in occluding contact with a porous separation membrane of polar material, said polar material exhibiting selective permeation for polar gases from gaseous mixtures, said polar porous separation membrane having a substantial void volume, wherein with respect to the polar gases of the porous separation membrane exhibits a determined intrinsic separation factor greater than the determined intrinsic separation factor of the halogenated polyphosphazene coating material, and the multicomponent membrane exhibits a separation factor significantly greater than the determined intrinsic separation factor of the polyphosphazene coating material and greater than the separation factor exhibited by the polar, porous separation membrane for polar gases.

9. The multicomponent membrane for polar gas separations according to claim 8 wherein the porous separation membrane is contacted with a polar solvent prior to or during coating with the polyphosphazenes.

10. The multicomponent membrane for polar gas separations according to claim 8 wherein the material of the porous separation membrane is comprised of polyamides.

11. The multicomponent membrane according to claim 8 wherein the porous separation membrane is comprised of polar material which is crosslinked.

12. The multicomponent membrane for polar gas separations according to claim 8 wherein with respect to polar gases selected from carbon dioxide and hydrogen sulfide in a feed gas mixture with $C_1$ to $C_3$ hydrocarbon gases, the multicomponent membrane preferentially permeates the polar gases, carbon dioxide and hydrogen sulfide.

13. The multicomponent membrane for polar gas separations according to claim 8 wherein the polyphosphazene coating material swells no more than about 15% by volume when exposed to aliphatic and aromatic hydrocarbons contained in the feed gas mixture.

* * * * *